United States Patent
Göttin et al.

(10) Patent No.: US 11,614,978 B2
(45) Date of Patent: Mar. 28, 2023

(54) DEEP REINFORCEMENT LEARNING FOR WORKFLOW OPTIMIZATION USING PROVENANCE-BASED SIMULATION

(71) Applicant: EMC IP Holding Company LLC, Hopkinton, MA (US)

(72) Inventors: Vinícius Michel Göttin, Rio de Janeiro (BR); Daniel Sadoc Menasché, Rio de Janeiro (BR); Alex Laier Bordignon, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1275 days.

(21) Appl. No.: 15/961,035

(22) Filed: Apr. 24, 2018

(65) Prior Publication Data
US 2019/0324822 A1    Oct. 24, 2019

(51) Int. Cl.
| | |
|---|---|
| G06F 9/50 | (2006.01) |
| G06N 3/04 | (2006.01) |
| G06F 9/455 | (2018.01) |
| G06N 3/08 | (2006.01) |

(52) U.S. Cl.
CPC ........ G06F 9/5083 (2013.01); G06F 9/45558 (2013.01); G06N 3/04 (2013.01); G06N 3/08 (2013.01); *G06F 2009/4557* (2013.01)

(58) Field of Classification Search
CPC .................................................... G06F 9/8083
USPC ........................................................ 706/25
See application file for complete search history.

(56) References Cited

U.S. PATENT DOCUMENTS

| | | | | |
|---|---|---|---|---|
| 9,043,751 | B2* | 5/2015 | Mazhar | G06F 9/5088 |
| 10,417,556 | B1* | 9/2019 | Fairbank | G06N 3/04 |
| 2008/0097816 | A1* | 4/2008 | Freire | G06Q 10/10 |
| | | | | 705/7.26 |
| 2009/0007063 | A1* | 1/2009 | Szpak | G06Q 10/10 |
| | | | | 717/105 |

(Continued)

OTHER PUBLICATIONS

Long-Ji Lin. 1992. Reinforcement learning for robots using neural networks. Ph.D. Dissertation. Carnegie Mellon University, USA. Order No. UMI Order No. GAX93-22750 (Year: 1992).*

(Continued)

*Primary Examiner* — James D. Rutten
(74) *Attorney, Agent, or Firm* — Ryan, Mason & Lewis, LLP

(57) ABSTRACT

Deep reinforcement learning techniques and provenance-based simulation are employed for resource allocation in a shared computing environment. One method comprises: obtaining a specification of a workflow of concurrent workflows in a shared computing environment, wherein the specification comprises workflow states and one or more control variables for the workflow in the shared computing environment; obtaining a simulation model of the workflow representing different configurations of the control variables; evaluating the control variables for the concurrent workflows using a reinforcement learning (RL) agent by observing the states and obtaining an expected utility score for control variable combinations for the execution of the concurrent workflows given an allocation of resources of the shared computing environment, wherein the RL agent performs, using the simulation model, the evaluating, the obtaining the expected utility score, and/or a training of an RL model; and providing an allocation of the resources based on the expected utility score.

20 Claims, 8 Drawing Sheets

(56) References Cited

U.S. PATENT DOCUMENTS

| | | | |
|---|---|---|---|
| 2013/0254402 A1* | 9/2013 | Vibhor | G06F 11/1464 709/226 |
| 2013/0263117 A1* | 10/2013 | Konik | G06F 9/45558 718/1 |
| 2015/0100530 A1* | 4/2015 | Mnih | G06N 20/00 706/25 |
| 2016/0359955 A1* | 12/2016 | Gill | H04L 67/1097 |
| 2017/0063974 A1* | 3/2017 | Wang | H04L 43/06 |
| 2017/0140270 A1* | 5/2017 | Mnih | G06N 3/08 |
| 2018/0121766 A1* | 5/2018 | McCord | G06N 3/08 |
| 2018/0137143 A1* | 5/2018 | Brundage | G06K 9/6255 |
| 2018/0285794 A1* | 10/2018 | Gray-Donald | G06Q 10/0633 |
| 2019/0236487 A1* | 8/2019 | Huang | G06N 20/00 |

OTHER PUBLICATIONS

Y. Zhao, X. Mingqing and G. Yawei, "Dynamic resource scheduling of cloud-based automatic test system using reinforcement learning," 2017 13th IEEE International Conference on Electronic Measurement & Instruments (ICEMI), 2017, pp. 159-165, doi: 10.1109/ICEMI.2017.8265752. (Year: 2017).*

E. Barrett, E. Howley and J. Duggan, "A Learning Architecture for Scheduling Workflow Applications in the Cloud," 2011 IEEE Ninth European Conference on Web Services, 2011, pp. 83-90, doi: 10.1109/ECOWS.2011.27. (Year: 2011).*

Patent Application entitled "Deep-Reinforcement Learning for Workflow Optimization", filed concurrently herewith U.S. Appl. No. 15/961,033, Gottin et al.

U.S. Appl. No. 15/800,587 entitled, "Simulation-Based Online Optimization of Workflows", filed Nov. 1, 2017.

Song et al., "An efficient initialization approach of q-learning for mobile robots," International Journal of Control, Automation and Systems, vol. 10, n° 1, pp. 166-172, 2012.

Matignon et al., "Reward function and initial values: better choices for accelerated goal-directed reinforcement learning.," em International Conference on Artificial Neural Networks, 2006.

E. Wiewiora, "Potential-based shaping and Q-value initialization are equivalent.," Journal of Artificial Intelligence Research, n° 19, pp. 205-208, 2003.

U.S. Appl. No. 15/364,449 entitled, "Snapshots to Train Prediction Models and Optimize Workflow Execution", filed Nov. 30, 2016.

Smart et al., "Practical reinforcement learning in continuous spaces," em Seventeenth International Conference on Machine Learning (ICML 2000), 2000.

Mnih et al., "Human-level control through deep reinforcement learning," Nature, vol. 518, n° 7540, pp. 529-533, 2015.

Kaelbling et al., "Reinforcement Learning: a survey," Journal of Artificial Intelligence Research, vol. 4, pp. 237-285, 1996.

R. S. Sutton, "Generalization in reinforcement learning: Successful examples using sparse coarse coding," Advances in neural information processing systems, 1996.

* cited by examiner

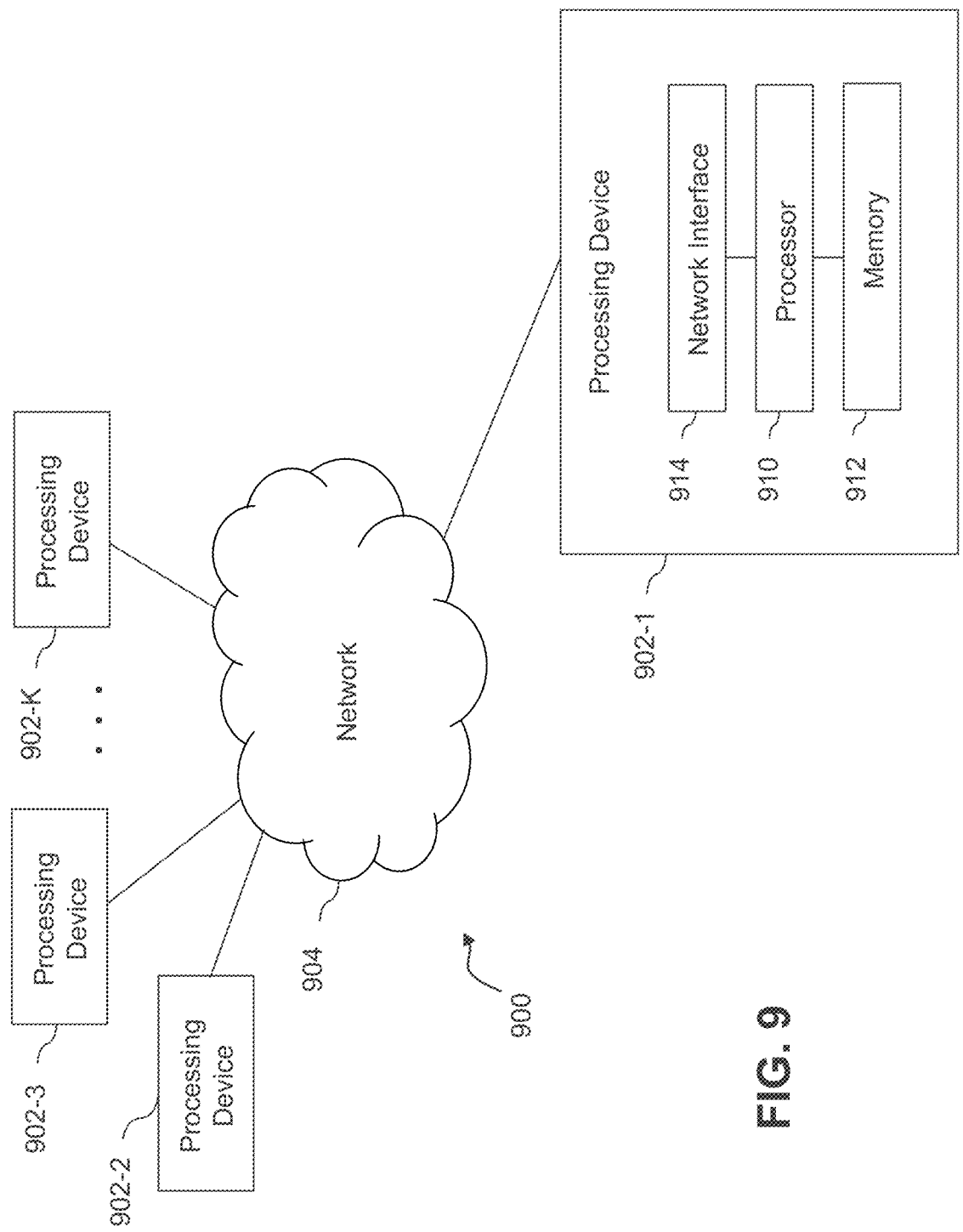

DEEP REINFORCEMENT LEARNING FOR WORKFLOW OPTIMIZATION USING PROVENANCE-BASED SIMULATION

FIELD

The field relates generally to resource allocation techniques for a shared computing environment.

BACKGROUND

Modern industrial systems rely heavily on automated workflows to execute tasks, such as data mining, pattern recognition and image processing. Such workflows are typically executed in a shared infrastructure. The sharing of the infrastructure resources is a non-trivial task, which typically requires the orchestration of virtual machines whose setup directly impacts the time and the cost to execute the workflows. This problem is particularly relevant in the context of Infrastructure and Platform as a Service providers, where providing scalability and efficient resource allocation for the execution of these workflows is necessary in order to save costs.

One way to cope with the challenge of automated workflow execution in shared infrastructures is to charge users based on an amount of resources allocated to each workflow. One strategy comprises pre-allocating resources to each workflow before its execution, according to user-defined specifications. Nonetheless, a non-automated strategy for resource allocation is not optimal for the execution of automated workflows.

A need therefore exists for improved techniques for allocating resources for workflow execution in a shared computing environment.

SUMMARY

Illustrative embodiments of the present disclosure provide deep reinforcement learning techniques for resource allocation in a shared computing environment using provenance-based simulation. In one embodiment, an exemplary method comprises: obtaining a specification of at least one workflow of a plurality of concurrent workflows in a shared computing environment, wherein the specification comprises a plurality of states of the at least one workflow and one or more control variables for the at least one workflow in the shared computing environment; obtaining a simulation model of the at least one workflow of the concurrent workflows representing a plurality of different configurations of the control variables in the at least one workflow by mapping the states of the at least one workflow based on a similarity given by one or more state similarity functions; evaluating a plurality of values of the control variables for an execution of the plurality of concurrent workflows using a reinforcement learning agent, wherein the evaluating comprises observing the plurality of states, including a current state comprising a current configuration of the plurality of concurrent workflows and the shared computing environment, and obtaining an expected utility score for a plurality of combinations of the control variables for the execution of the plurality of concurrent workflows given an allocation of resources of the shared computing environment corresponding to the combination of the control variables in the current state, wherein the reinforcement learning agent performs, using the simulation model, (i) the evaluating, (ii) the obtaining the expected utility score, and/or (iii) a training of a reinforcement learning model used by the reinforcement learning agent; and providing an allocation of the resources of the shared computing environment reflecting the combination of the control variables having the expected utility score that satisfies a predefined score criteria. The reinforcement learning agent is optionally updated by further training the model with the states that result from the allocation as new training samples.

In some embodiments, the values of the control variables for the execution of the concurrent workflows are evaluated by observing the current state and selecting an action based on a path in the simulation model that substantially maximizes at least one utility function for one or more nodes in the simulation model.

In one or more embodiments, estimated values of the expected utility score are given by observing the current state and the estimated values of the expected utility score are estimated based on a path in the simulation model that substantially maximizes at least one utility function for one or more nodes in the simulation model for a predefined number of training epochs.

In at least one embodiment, the reinforcement learning model used by the reinforcement learning agent is trained using input/output training pairs generated from the simulation model as a training batch for a predefined number of training epochs.

Other illustrative embodiments include, without limitation, apparatus, systems, methods and computer program products comprising processor-readable storage media.

BRIEF DESCRIPTION OF THE DRAWINGS

FIG. 9 illustrates another exemplary processing platform that may be used to implement at least a portion of one or more embodiments of the disclosure.

DETAILED DESCRIPTION

Figure 1:
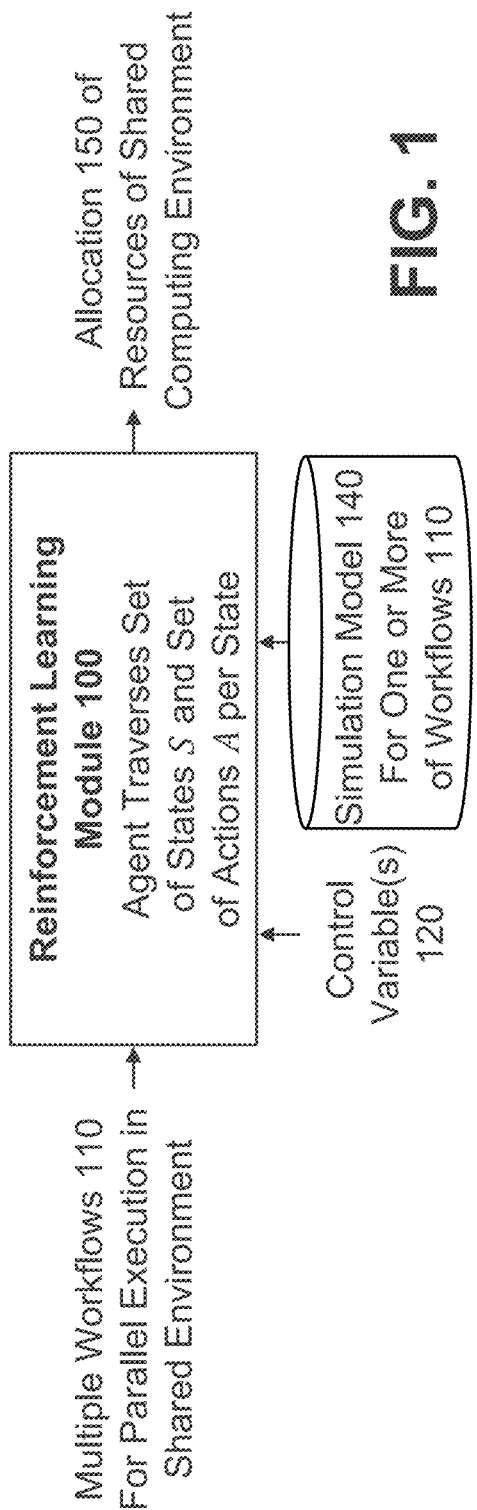
FIG. 1 illustrates an exemplary reinforcement learning module for workflow optimization, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for deep reinforcement learning-based resource allocation in a shared computing environment using provenance-based simulation.

In one or more embodiments, dynamic resource allocation techniques are provided for workflow execution that learn how workflows behave under different infrastructure configurations, while at the same time reducing a waste of resources during a learning stage.

In some embodiments, reinforcement learning agents are employed to balance between the exploration of new configurations and the exploitation of known resource allocation policies. One or more embodiments of the present disclosure enable and enhance an application of reinforcement learning (RL) in the context of workflow optimization.

In at least one embodiment, the disclosed techniques for reinforcement learning-based resource allocation in a shared computing environment employ provenance-based simulation to reduce a convergence time and/or increase a robust generalization of the RL model. A simulation state-space is optionally leveraged with precomputed utility metrics to bootstrap learning policies, to initialize the value function and/or to generate training samples.

In this manner, RL techniques and provenance-based simulation are employed for workflow optimization. The RL agents optionally balance an exploration of new configurations, an exploitation of known resource allocation policies; and the use of precomputed substantially optimal paths in simulation state spaces constructed from provenance data. The simulation information can be used, for example, for a value function initialization (e.g., value or cost function shaping for indirect policy tuning); policy optimization (e.g., guiding the exploration-exploitation choice and exploration-exploitation shaping for direct policy tuning); and generation of training samples (e.g., simulation of traces for experience replay).

In at least one embodiment, the disclosed techniques for reinforcement learning-based resource allocation in a shared computing environment employ aspects of the simulation in order to speed up the convergence of the reinforcement learning approach. The initialization of reinforcement learning methods plays an important role on convergence. Aspects of the present disclosure bootstrap reinforcement learning solutions using workflow models that characterize how resources are demanded over time.

In some embodiments, a deep neural network architecture is employed with one input (e.g., the current state) and multiple outputs (e.g., one output for each of the possible resource allocations) to represent the Q-value function. Each output characterizes the estimated cost-to-go for the completion of the execution of the workflows under the corresponding allocation.

While autonomous computing envisions automatically configuring a system so as to efficiently allocate its resources, reinforcement learning aims at automatically learning substantially optimal policies. Some embodiments provide reinforcement learning solutions for the workflow optimization problem by leveraging (1) machine learned models for cost initialization, (2) composition of batches of past experiences, and (3) a particular Deep Neural Network (DNN) architecture. The combination of these techniques enhances robustness and improves the convergence of the RL process.

One or more embodiments of the disclosure dynamically determine one or more control variables that impact a cost associated with the execution of a given workflow. Such variables include, for example, a number of processing cores and/or an amount of memory allocated to a given workflow. The impact of such variables on the cost is not assumed to be fully known in advance.

Some embodiments leverage control theoretic tools to address the problem of dynamic variable control for workflow optimization. Although many control theory tools for dynamic discrete system optimization exist, such tools usually assume that the dynamics of the system being considered are known. In particular, many of these solutions assume that the impact of control variables on the cost function is given. Reinforcement learning, on the other hand, does not rely on such assumptions. Nonetheless, there is still a challenge of mapping the workflow optimization problem into the reinforcement learning framework. In the following paragraphs, challenges related to the application of reinforcement learning in the workflow optimization problem are addressed.

The reinforcement learning process relies on the estimates of rewards associated with each action at each of the model states. These initial estimates of rewards can have a significant impact on the time that it takes for the learning algorithm to converge. For this reason, using prior knowledge about the system is often desirable. See, for example, E. Wiewiora, "Potential-Based Shaping and Q-Value Initialization are Equivalent," Journal of Artificial Intelligence Research, No. 19, 205-08 (2003).

In the context of workflow optimization, the reward typically configures a cost for the complete execution of the workflow(s) (e.g., a negative reward). These costs are not trivially known, and a method is needed both for the estimation of these costs and for leveraging this knowledge in initializing the estimates of the costs associated to actions at each state.

The reinforcement learning framework raises the challenge of bootstrapping the policy, which impacts the convergence of the learning process. This challenge is related to the challenge of initializing the costs at each state.

Determining the policy can be especially challenging in initial iterations of the learning, as parts of the state space may be under-sampled and the costs may be associated with high initialization errors. As there are many paths that can be explored, it may be beneficial to initially take actions not only based on costs but also based on other strategies that account for knowledge about the domain. A method is needed for leveraging this knowledge in initializing the policy for the learning process.

As noted above, the initialization of cost estimates implicitly determines a policy bootstrapping. Nonetheless, shaping the policy by adjusting cost estimates is challenging. For instance, one may want to enforce that the policy satisfies certain properties, or may already have an initial guess of the best policy starting from a subset of states. For this reason, one embodiment of the present disclosure derives an explicit policy bootstrapping strategy and combines the explicit bootstrapping strategy with an implicit strategy as determined by the initialization of cost estimates as discussed above.

The training of a model typically requires many samples. Collecting this data from the real environment is often associated with errors, and may require the execution of workflows that take hours or days to complete. Ideally, executions for the sake of generating sample measurements alone should be avoided, and viable samples should be extrapolated, if possible.

Workflow Optimization Consider the problem of workflow optimization in shared environments, especially from the point of view of Infrastructure as a Service (IaaS)

providers. In IaaS environments, workflows are typical large-scale client applications, demanding large amounts of distributed computing resources. See, for example, L. P. Kaelbling et al., "Reinforcement Learning: A Survey," Journal of Artificial Intelligence Research, Vol. 4, 237-85 (1996); and/or V. Mnih et al., "Human-Level Control Through Deep Reinforcement Learning," Nature, Vol. 518, No. 7540, 529-33 (2015). The optimization problem in workflow executions in IaaS environments is defined in relation to one or more Quality of Service (QoS) metrics. The problem comprises assigning values to one or more control variables related to the usage and allocation of computational resources, in order to maximize one or more utility metrics derived from QoS metrics.

Control variables represent features that can be controlled by the resource manager of the execution environment. Typically, in applications for decision making and optimization in IaaS environments, these variables are related to the usage and allocation of computational resources to certain tasks or workloads. The control variables are associated with the possible "actions" that the resource manager can take. In at least one embodiment, as in U.S. patent application Ser. No. 15/800,587, filed Nov. 1, 2017, entitled "Simulation-Based Online Optimization of Workflows," (now U.S. Pat. No. 11,004,025), incorporated by reference herein in its entirety, this corresponds to increasing or decreasing the number of processing cores allocated for the execution of a batch of workflows. In this sense, the possible values for the control variables limit and determine the transitions in a state space.

Considering the target QoS metrics as utility metrics, the workflow optimization problem in IaaS is defined as maximizing (or minimizing) utility (or negative utility) metrics over the execution of one or more workflows sharing and competing for computational resources. From the perspective of the service provider, an important aspect for optimization is to minimize resource allocation while still ensuring that Service Level Agreement (SLA) conditions are met. It is additionally assumed in some embodiments that one or more utility functions are defined, numerically representing preferences and tradeoffs in cost, execution time and other quality of service metrics. In one embodiment, as in U.S. patent application Ser. No. 15/800,587, filed Nov. 1, 2017, entitled "Simulation-Based Online Optimization of Workflows," (now U.S. Pat. No. 11,004,025), incorporated by reference herein in its entirety, the concept is exemplified with a negative utility metric of total execution cost, which directly relates to resource allocation (e.g., number of cores) and total execution time, and aims to substantially minimize the total running cost for a batch of concurrent workflows. To this end, the following cost function is used in one or more embodiments: given a number of allocated processing cores (the control variable in the exemplary domain) and the time to finish a workflow, the cost function yields the total execution cost for the processing of that workflow with that number of cores.

Reinforcement Learning

As noted in the Survey referenced above, Reinforcement Learning is a technique within the machine learning field in which virtual agents take actions so as to substantially maximize a cumulative reward. Reinforcement Learning differs from other supervised learning techniques in that it does not rely on labeled complete input-output (I/O) samples (e.g., there's no strict need for providing complete examples where the output for each input is known a priori). Instead, Reinforcement Learning seeks to substantially optimize the process at each decision step by balancing exploration of states (possibly still unknown) and exploration of the current best guess. The output of a Reinforcement Learning solution is typically a policy determining the substantially optimal action at each possible state within the environment.

A Reinforcement Learning application defines the following aspects: the environment, the agent, the actions available to the agent, and the reward for each action. Several possible techniques exist, such as SARSA (State Action Reward State Action) or Q-Learning (based on an action-value function). In one or more embodiments of the present disclosure, the Q-Learning technique is employed. In particular, an application of the Deep Q-Learning technique is employed, as discussed further below.

Generally, in some embodiments, Deep Q-Learning learns the Q function described by equation (1), below, as a neural network:

$$Q(s_t, a_t) \leftarrow \underbrace{(1-\alpha)Q(s_t, a_t)}_{\text{Old value}} + \underbrace{\underbrace{\alpha}_{\text{Learning rate}} \underbrace{\left( \underbrace{r_t}_{\text{Reward}} + \underbrace{\gamma}_{\text{Discount factor}} \underbrace{\max_a Q(s_{t+1}, a)}_{\text{Estimate of optimal future value}} \right)}_{\text{Learned Value}}} \quad (1)$$

The input of the network is the state s and an action a and the network will output an estimated quality of the state-action, as discussed further below in conjunction with FIG. 2.

For a more detailed discussion of reinforcement learning techniques, see, for example, United States Published Patent Application No. 2019/0325304, entitled "Deep Reinforcement Learning for Workflow Optimization," incorporated by reference above.

Deep-Reinforcement Learning for Workflow Optimization

One or more embodiments of the disclosure apply reinforcement learning techniques to the workflow optimization problem. This technique has been successfully applied to several distinct problems in other contexts, as discussed in the referenced Survey, and proofs of convergence of the technique hold under mild assumptions. See, for example, R. S. Sutton and A. G. Barto, "Reinforcement Learning: an Introduction," Cambridge: MIT Press (1998). In the following discussion, an effective and efficient approach is described to apply reinforcement learning to solve the workflow optimization problem.

Reinforcement Learning for Workflow Optimization

In this section, a reinforcement learning solution is described for the problem of setting environmental control variables (e.g., amount of memory and number of CPU (central processing unit) cores) aiming at a substantially optimal workflow execution. In particular, the exemplary embodiments focus on a class of reinforcement learning solutions known as Q-Learning.

FIG. 1 illustrates an exemplary reinforcement learning module 100 for workflow optimization, according to an embodiment of the disclosure. In the exemplary setup of FIG. 1, the execution of multiple workflows 110 in parallel is considered. As noted above, an agent traverses a set of states S and a set of actions A per state. The system state is given by the telemetry metrics of the machines executing the workflows and the execution state of each of the workflows at each instant. In a cloud environment, for example, the system state comprises the set of telemetry metrics collected from all the machines running the workflows of interest. The system state, together with a corresponding control variable 120, is assumed to contain the information required to determine the next state.

As shown in FIG. 1, the exemplary reinforcement learning module 100 also processes a simulation model 140 of one or more of the multiple workflows 110 representing different configurations of workflow control variables, by mapping workflow states based on a similarity metric, as discussed further below.

At each state, the agent can perform actions that affect the environment and that impact the immediate cost and the transition towards the next state. In the exemplary setup, the three exemplary actions available comprise setting the number of processing cores to 2 cores, 4 cores or 12 cores. The agent is in charge of determining, at each decision opportunity, whether to maintain the current system configuration or to act towards a change in the number of cores. An epoch is defined in some embodiments as the duration of time between the start of the execution of a batch of workflows and the completion of the execution of the workflows in the batch.

In some embodiments, the exemplary reinforcement learning module 100 generates an allocation 150 of one or more resources of the shared computing environment, as discussed further below.

If state variables are discretized, the state space cardinality grows exponentially with respect to the number of state variables. In addition, note that certain state variables, such as the CPU usage, best fit into a continuous representation. The large cardinality of the state space, or its infinite dimension, implies that states are usually not revisited in between epochs. This motivates the use of Deep Q-Learning, wherein a deep neural network represents the value function which maps states into their corresponding values. The use of neural networks as a function approximator to represent the value function addresses the challenge of dealing with a state space with large cardinality, or an infinite state space, by leveraging correlations between state features and corresponding state values.

Figure 2:
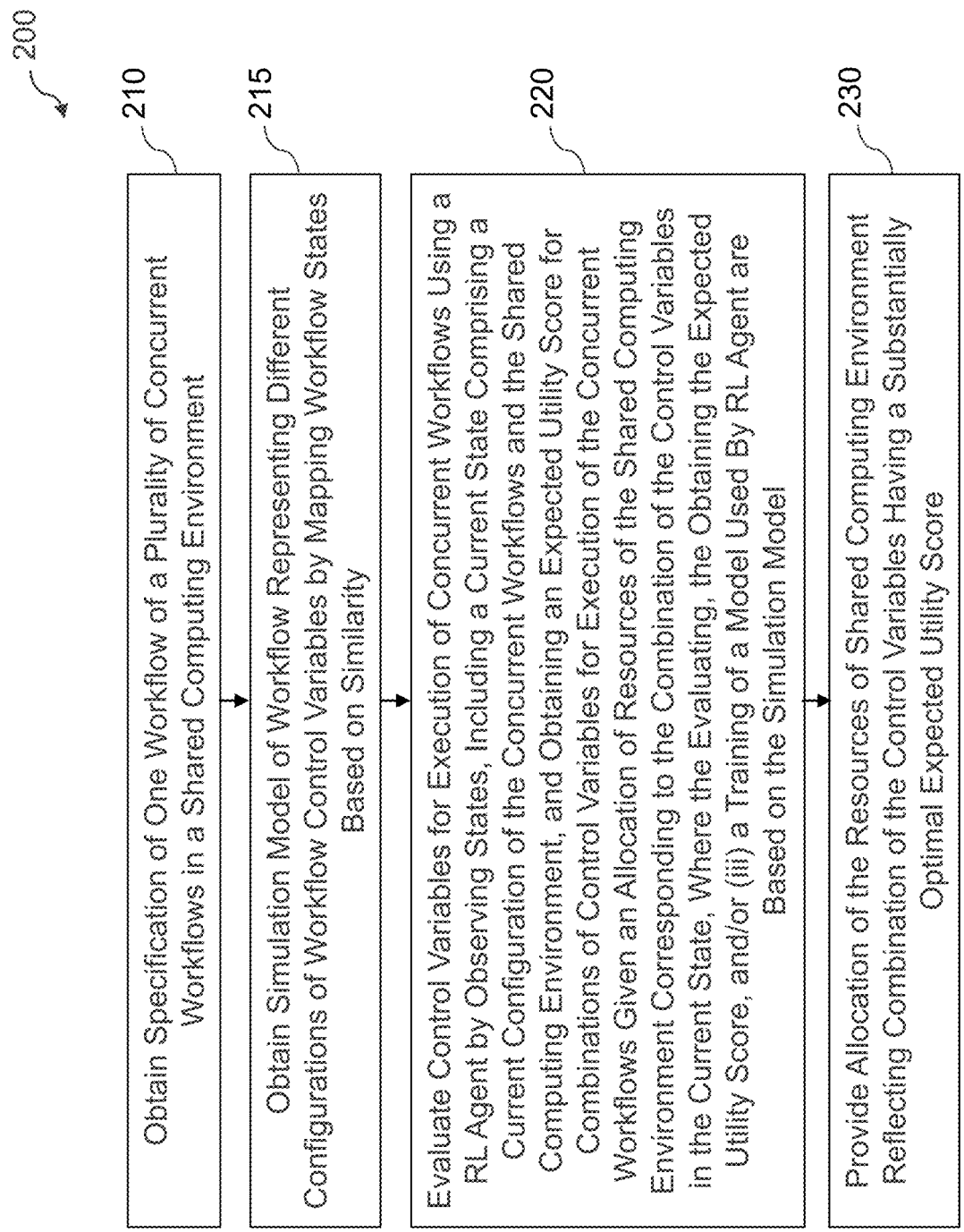
FIG. 2 is a flow chart illustrating an exemplary implementation of a reinforcement learning process for workflow optimization, according to one embodiment of the disclosure.

FIG. 2 is a flow chart illustrating an exemplary implementation of a reinforcement learning process 200 for workflow optimization, according to one embodiment of the disclosure. As shown in FIG. 2, the exemplary reinforcement learning process 200 initially obtains a specification of one workflow of a plurality of concurrent workflows in a shared computing environment. In one or more embodiments, the specification obtained in step 210 comprises a plurality of states observed over time of the at least one workflow and control variables for the at least one workflow in the shared computing environment.

The exemplary reinforcement learning process 200 also obtains a simulation model of the workflow of the plurality of concurrent workflows during step 215 representing a plurality of different configurations of the control variables of the workflow of the concurrent workflows by mapping the states of the workflow based on a similarity given by one or more state similarity functions.

During step 220, the exemplary reinforcement learning process 200 evaluates a plurality of values of the control variables for an execution of the plurality of concurrent workflows using at least one reinforcement learning agent. In some embodiments, the evaluating comprises observing the states, including a current state comprising a current configuration of the concurrent workflows and the shared computing environment, and obtaining an expected utility score for a plurality of combinations of the control variables for the execution of the plurality of concurrent workflows, given an allocation of resources of the shared computing environment corresponding to the combination of the control variables in the current state, where the reinforcement learning agent performs, using the simulation model, (i) the evaluating, (ii) the obtaining the expected utility score, and/or (iii) a training of a model used by the reinforcement learning agent.

Finally, during step 230, the reinforcement learning process 200 provides an allocation of the resources of the shared environment reflecting the combination of the control variables having the expected utility score that satisfies a predefined score criteria (e.g., a substantially optimal expected utility score).

Deep Q-Learning for Workflow Optimization

Figure 3:
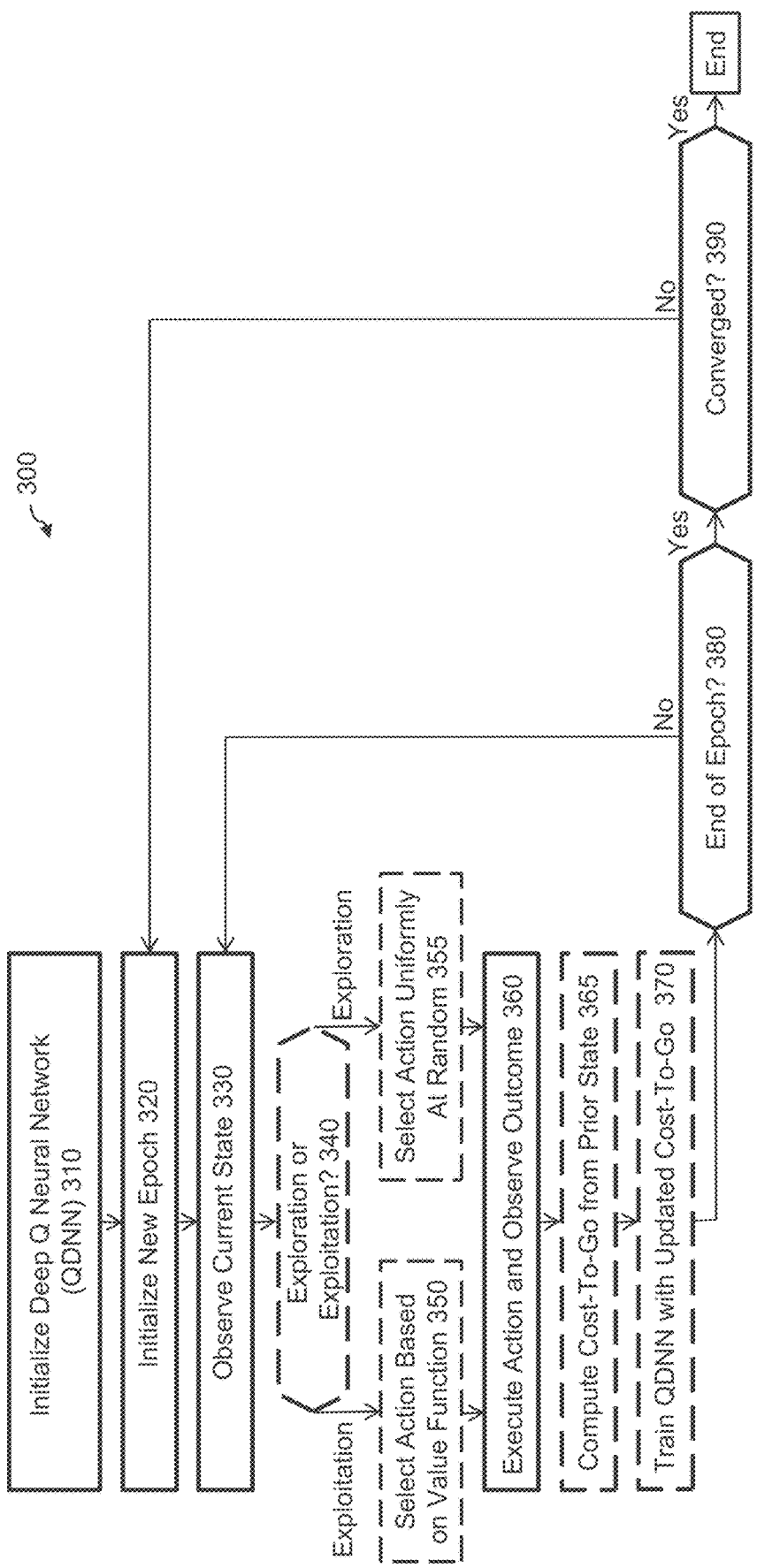
FIG. 3 is a flow chart illustrating an exemplary Deep Q-Learning process for the workflow optimization problem, according to an embodiment.

In this section, the use of a Deep Neural Network (DNN) implementation of the reinforcement learning module 100 of FIG. 1 under a Deep Q-Learning for workflow optimization is described. FIG. 3 is a flow chart illustrating an exemplary Deep Q-Learning process 300 for the workflow optimization problem, according to an embodiment.

As shown in FIG. 3, the exemplary Deep Q-Learning process 300 initializes a deep Q neural network (QDNN) model with arbitrary weights during step 310. These weights are updated after each training phase. Generally, a QDNN maps a given system state into a set of values representing the "cost-to-go" associated with a given action at that state. The QDNN is a function approximator to the Q function, Q: $(s,a) \rightarrow Q(s,a)$ where s and a are a state and an action, respectively, and $Q(s,a)$ is the estimated cost-to-go associated to executing action a at state s. By jointly producing as outputs the estimates of the cost-to-go for all possible actions at state s, the DNN captures correlations between features, actions and costs which otherwise would not have been accounted for.

Next, the exemplary Deep Q-Learning process 300 initializes a new epoch during step 320. In the context of the workflow optimization problem, an epoch is defined as corresponding to the execution of a batch of workflows. The epoch is initialized by the creation of a new environment. At initialization, the time $\tau$ between decision opportunities is determined, i.e., the time interval in between opportunities to modify the control variables, corresponding to the definition of the simulation resolution.

The execution of actions throughout the epoch is then configured in steps 330 through 370 (e.g., after each interval of $\tau$ time units, until the end of the epoch). In step 330, the current state of the system is observed.

Step 340 configures the choice of exploration or exploitation: the agent needs to decide between taking the optimal action given its acquired knowledge (exploitation) or exploring new (potentially better) actions and opportunities (exploration). To choose between the two options, an exploration-exploitation threshold between (0,1) is determined. Then, a number is sampled uniformly at random in that range, and if the number is smaller (resp., larger) than the threshold, exploration (resp., exploitation) is taken.

In step 355, the agent selects a random action from those available in the current state (from step 330) if exploration is taken in step 340. However, if exploitation is taken in step 340, then the agent consults the DNN to select the action so far considered the best at the current state based on the value function during step 350. The agent first determines the current telemetry information and the state of all executing workflows, combining them into the current state. The current state is then fed to the DNN, which outputs a vector of cost-to-go values associated to all the possible actions.

The optimal action can then be chosen by selecting the action which yields the minimum cost-to-go.

Notice that, in the first iterations, the decision between exploitation and exploration during step 340 is unimportant. Since the QDNN yields values highly influenced by its (random) initialization, the agent selects roughly arbitrary actions until later iterations, where the QDNN starts to converge and the de facto best actions start to yield better results.

In step 360, the selected action is executed and its outcome in the environment is observed and recorded. After an action is executed, the agent transitions to its next state, and a given instantaneous cost is incurred. This cost is associated to the cost of maintaining the current infrastructure in between the visit to the first state and the transition to the next state. In one setup, the instantaneous reward (negative cost) at time t is given by:

$$r_t(s_t, a_t) = -(c_t(s_t)\tau + h_t(s_t, a_t)),$$

where $c_t$ is the cost per time unit associated to the infrastructure maintained at state $s_t$, and $h_t(s_t, a_t)$ is the cost of changing the infrastructure from the one associated to $s_t$ to that determined by $a_t$. By setting the reward equal to the negative cost, a minimization problem is translated into a maximization problem.

In step 365, the cost-to-go y is given by the current state, an action and estimate of the Q function. Note that while estimating the last term in the equation above, the DNN is used to assess the best action a at the next state $s_{t+1}$. Initially, this assessment is random, as it is based on a QDNN initialized with weights set uniformly at random.

Finally, at step 370, the QDNN is trained with samples collected from the execution of actions and their corresponding cost-to-go. The samples are of the format $(S_t, a_t, r_t, s_{t+1})$. Given a set of samples and corresponding cost-to-go values, the DNN is trained using a gradient descent method. In the simplest case, after each sample is collected, the DNN is retrained using that sample.

A test is performed during step 380 to determine if the end of the epoch has been reached. If it is determined during step 380 that the end of the epoch has not been reached, then program control returns to step 330, otherwise program control proceeds to step 390.

A test is performed during step 390 to determine if the QDNN has converged. If it is determined during step 390 that the QDNN has not converged, then program control returns to step 320, otherwise program control ends.

It is noted that steps 340, 350, 355, 365 and 370 are shown in FIG. 3 with a dashed outline to indicate that one or more of these steps are replaced by alternative steps for alternate implementations of the exemplary Deep Q-Learning process 300, as discussed further below in conjunction with FIGS. 5 through 7.

Snapshot Simulation-Based Optimization of Workflows

As noted above, one or more embodiments of the disclosed resource allocation techniques based on reinforcement learning leverage a simulation state-space of the workflow execution environment. Consider a snapshot-based simulation, in which the snapshots comprised of the contextual provenance data and telemetry information configure states of the execution of workflows. These states are then mapped to similar states in which the control variables are changed through a set of state-mapping functions.

By mapping each state (defined by a set of snapshots) to the most similar state for each possible value of the control variable(s), a state space graph is generated, where nodes represent states of the computation and edges correspond to the changes in control variables.

Figure 4:
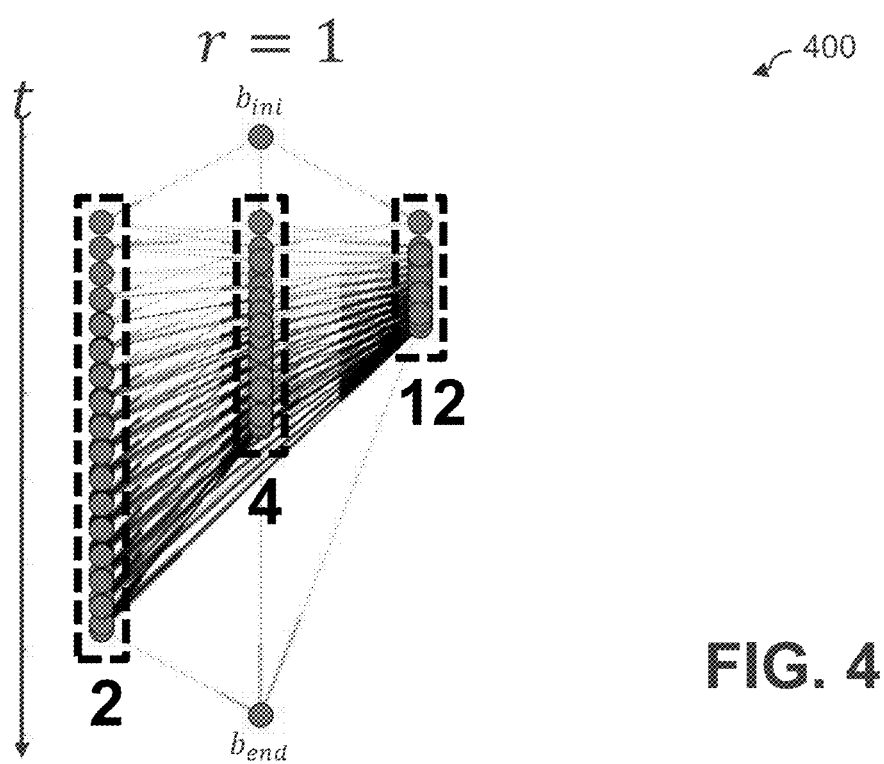
FIG. 4 illustrates a graphical representation of a state space for an example where states are horizontally aligned by a configuration and vertically aligned by a relative timestamp, according to one embodiment.

FIG. 4 illustrates a graphical representation of a state space 400 for an example where the states are horizontally aligned by a configuration (e.g., number of cores) and vertically aligned by a relative timestamp, according to an embodiment. Generally, the exemplary state space 400 highlights the alignment of states by the configuration they represent.

The exemplary state space 400 of FIG. 4 allows an exploration of the state space of the simulation. By accounting for dynamic changes in the value(s) of the control variable(s) that impact resource allocation, the execution paths observed in the original measurements in which the snapshots were collected can be extrapolated.

The exemplary state space 400 is horizontally aligned by the number of processing cores (e.g., 2, 4, or 12 cores) and vertically aligned by the relative timestamp, between an initial state, $b_{ini}$, and an ending state, $b_{end}$.

In one or more embodiments, the exemplary state space 400 of FIG. 4 can be employed to substantially optimize one or more executions of a workflow. Given one or more utility functions that represent the aspects of interest for the execution environment (e.g., the total computational cost for finishing all workflows) a search can be performed for the substantially optimal paths that maximize the utility metric in the simulation. The results of this search are persisted in a data structure (typically, as the state space 400). By exploring alternative simulated executions and the preprocessed optimal paths, a substantially optimal configuration of the control variable(s) can be identified that substantially maximizes the utility score for each state of the simulation.

In some embodiments, a state-similarity function allows for the comparison, in a substantially real time execution of a new set of workflows, between a newly observed state and other states in the simulation. Upon observing the current state of this new real time execution, a substantially most-similar state is identified in the simulation and the configuration of the control variable(s) is adopted that substantially matches the preprocessed substantially optimal configuration of the substantially most-similar previously explored state.

For a more detailed discussion of simulation-based optimization of workflows, see, for example, U.S. patent application Ser. No. 15/800,587, filed Nov. 1, 2017, entitled "Simulation-Based Online Optimization of Workflows," (now U.S. Pat. No. 11,004,025), incorporated by reference herein.

Improving Speed of Deep Q-Learning and Simulation

The substantial optimization of workflow executions as described above may pose challenges, for example, related to the delay of the DNN to converge towards a desirable policy. In one or more embodiments, such delay may be reduced by properly initializing the DNN weights. To this aim, the provenance collection and simulation techniques described above are optionally employed to improve convergence. In the following discussion, further details are provided on how to make use of simulations to speed up the convergence of the QDNN.

Improving Learning by Leveraging Shortest-Path Simulation

Figure 5:
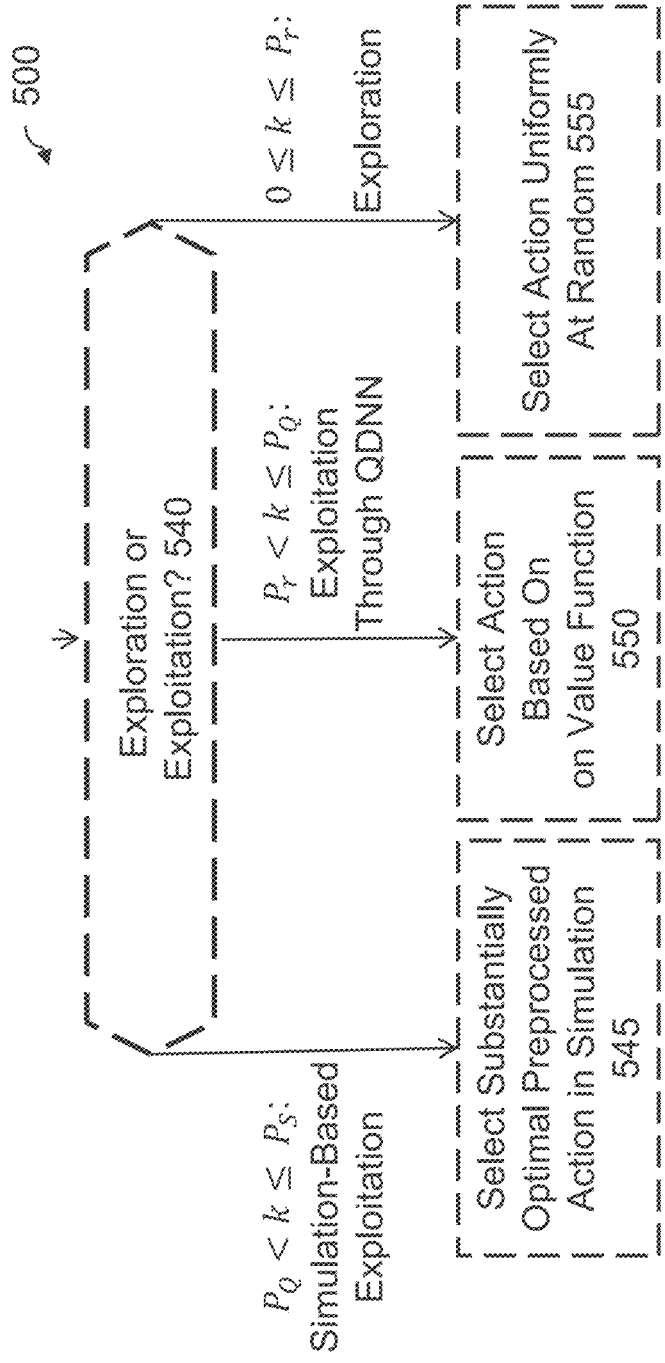
FIGS. 5 through 7 are flow charts illustrating exemplary alternative implementations of portions of the exemplary Deep Q-Learning process of FIG. 3, according to some simulation-based embodiments of the disclosure.

FIG. 5 is a flow chart illustrating an exemplary alternative implementation 500 of portions of the exemplary Deep Q-Learning process 300 of FIG. 3, according to one simulation-based embodiment of the disclosure. As shown in FIG. 5, the exemplary alternative implementation 500 replaces steps 340, 350 and 355 from FIG. 3 with steps 540, 545, 550 and 555, discussed hereinafter.

In the embodiment of FIG. 3, the RL agent either explores an action chosen uniformly at random in step 355 or exploits the best action as assessed using the QDNN during step 350. However, during the early epochs, the QDNN may be biased by its initialization.

Likewise, in the embodiment of FIG. 5, the exemplary alternative implementation 500 also allows the RL agent to explore an action chosen uniformly at random in step 555 (when step 540 determines that the value of the pseudo-random number, k, is between 0 and Pr) or to exploit the best action as assessed using the QDNN during step 550 (when step 540 determines that the value of the pseudo-random number, k, is between $P_r$ and $P_Q$).

In addition, to improve the speed of the convergence process, the exemplary alternative implementation 500 of FIG. 5 provides an additional possibility at that stage. As shown in FIG. 5, when step 540 determines that the value of the pseudo-random number, k, is between $P_Q$ and $P_S$, the exemplary alternative implementation 500 exploits the state space during step 545 using the simulation, rather than using the QDNN. In particular, during step 545, the current state is observed and an action is selected based on a substantially shortest-path algorithm in the simulation state-space, as discussed above in conjunction with FIG. 4.

Thus, in step 540, the choice is between exploration, exploitation with QDNN or exploitation with shortest-path simulation. As shown in FIG. 5, and noted above, threshold values are used to decide between acting based on previous knowledge (exploitation with QDNN or exploitation with shortest-path simulation) and acting based on exploration.

Rather than having a single threshold to select between exploration and exploitation, threshold values are defined as follows: $0 \leq P_r < P_Q < P_s = 1$, determining the relative probabilities. The decision is determined by sampling a pseudo-random number k between (0, 1). This random sample is compared against the threshold values, and the corresponding action is executed:

Exploration is taken in step 555 if $0 \leq k \leq P_r$;
Exploitation through the QDNN is taken in step 550 if $P_r < k \leq P_Q$; and
Exploitation of the shortest-path simulation is taken in step 545 if $P_Q < k \leq P_s$.

Experiments have demonstrated that typical values of the thresholds determine that exploration, exploitation using QDNN and exploitation through shortest-path simulations should be executed, for example, 20%, 25% and 55% of the time, respectively, corresponding to values $P_r = 0.2$, $P_Q = 0.45$ and $P_s$ (by definition) equal to 1.

Note that such thresholds can be updated during execution, e.g., to favor exploitation as the RL agent evolves.

Improving Learning by Initializing Value Function Based on a Priori Data

The convergence of the QDNN is significantly impacted by steps 350 or 355 the Deep Q-Learning process 300 of FIG. 3. During the first iterations of the Deep Q-Learnng process 300, the estimates of the cost-to-go, which is part of the right-hand-side (RHS) of the equation (1), may still be poor. The Deep Q-Learning process 300 may require multiple steps before the estimates become more representative.

It is known that subtle changes to equation (1), such as those proposed by SARSA (see, e.g., R. S. Sutton, "Generalization in Reinforcement Learning: Successful Examples Using Sparse Coarse Coding," Advances in Neural Information Processing Systems (1996)) can significantly improve the robustness of Q-Learning. In particular, the cost-to-go term that appears in the RHS of equation (1) plays an important role in the convergence of Q-learning.

In one or more embodiments, the cost-to-go term in the RHS of equation (1) is adjusted using simulations. To that end, estimates are initialized using the methods described in U.S. patent application Ser. No. 15/800,587, (now U.S. Pat. No. 11,004,025), incorporated by reference above. After a state is visited, the RL agent searches for the closest state among those for which shortest path estimates to complete execution, e.g., obtained through simulations, are available. From such closest state, it is possible to assess the minimum cost to complete the execution, which can, in turn, be used as an estimate for the cost-to-go that appears in the RHS of equation (1).

Figure 6:
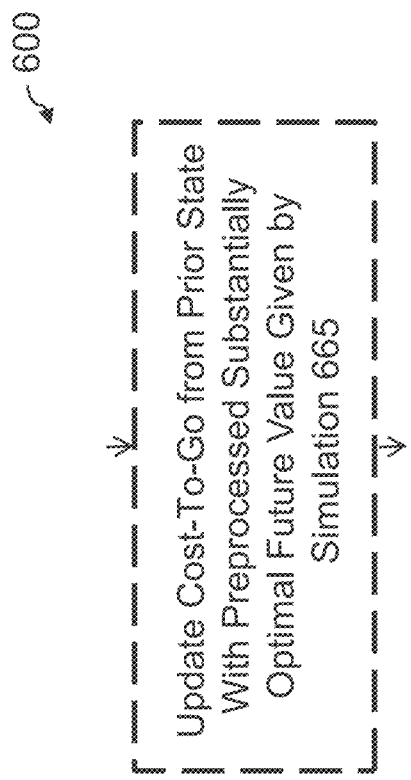

FIG. 6 is a flow chart illustrating an exemplary alternative implementation 600 of portions of the exemplary Deep Q-Learning process 300 of FIG. 3, according to one simulation-based embodiment of the disclosure. As shown in FIG. 6, the exemplary alternative implementation 600 replaces step 365 from FIG. 3 with step 665, discussed hereinafter.

In the embodiment of FIG. 3, during step 365, the cost-to-go y is given by the current state, an action and estimate of the Q function.

In the embodiment of FIG. 6, the exemplary alternative implementation 600, during step 665, updates the cost-to-go from the previous state using the preprocessed substantially optimal future value given by the simulation. As noted above, the RL agent searches for the closest state among those for which shortest path estimates to complete execution, e.g., obtained through simulations, are available. This closest state can be determined from any predetermined state-similarity function, as would be apparent to a person of ordinary skill in the art. From such closest state, it is possible to assess the minimum cost to complete the execution, which is used during step 665 as an estimate for the cost-to-go.

Generating Training Samples Via Simulation

To address the fact that running new policies in a testbed is expensive, one or more embodiments experiment with policies in a simulated environment. This solution may be similar to Q-planning, which comprises running the Q-learning algorithm in a simulated environment. One goal is to extract information from the collected samples, in-between interactions with the real environment. Batches of past experiences are optionally leveraged to reduce the effect of outliers in the training of the QDNN.

United States Published Patent Application No. 2019/0325304, entitled "Deep Reinforcement Learning for Workflow Optimization,", modified step 370 of the Deep Q-Learning process 300 of FIG. 3 to save the input/output pairs as a database of samples. In one or more embodiments of the present disclosure, a database of samples generated through simulation runs is employed.

The simulation of workflows can be used to generate samples which will be used to train the neural network that characterizes the Q-value function. Recall that each sample comprises (a) the current state; (b) an action; (c) the following state and (d) an instantaneous reward. By collecting these samples using a model, interactions with the real world are avoided, and the state space more can be sampled more often at the most relevant regions. In this manner, the batches used for training the neural networks should be more suited for a faster convergence, as they are more representative of a real system execution.

Figure 7:
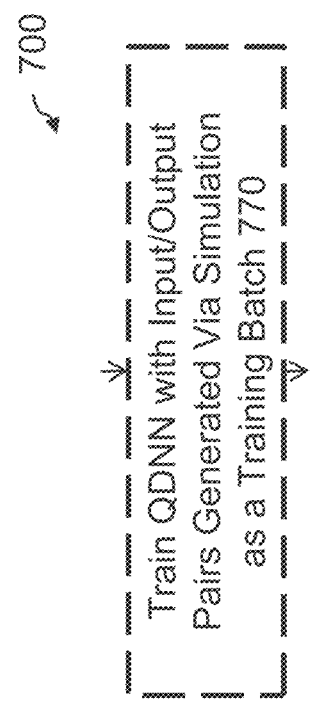

FIG. 7 is a flow chart illustrating an exemplary alternative implementation 700 of portions of the exemplary Deep Q-Learning process 300 of FIG. 3, according to one simulation-based embodiment of the disclosure. As shown in FIG. 7, the exemplary alternative implementation 700 replaces step 370 from FIG. 3 with step 770, discussed hereinafter.

In the embodiment of FIG. 3, during step 370, the QDNN is trained with samples collected from the execution of actions and their corresponding cost-to-go. In the embodiment of FIG. 7, during step 770 the QDNN is trained with input/output pairs generated via simulation from those samples as a training batch. The training-on-batch builds robustness, as outliers do not significantly influence the weights of the QDNN provided that most of the elements of the batch are behaved samples. If quality metrics of the simulation are available (such as distance metrics between simulated states) the simulated samples are behaved based on, for example, a minimum simulation quality value as a cut-off threshold.

Finally, in some embodiments, the generation of samples through simulation allows the model to explore generalized paths in the state-space via the experience replay mechanism. In other words, the learning process may mix-and-match actual explorations of the state space with hypothetical explorations of non-executed scenarios. Although this may incur greater convergence times, the resulting models may able to better generalize.

Resource Allocation in Multi-Cloud Environments

The disclosed simulation-enhanced deep reinforcement learning techniques for resource allocation may be applied to multi-cloud environments, as would be apparent to a person of ordinary skill in the art, based on the present disclosure. Some distinctions between single cloud and multi-cloud environments include: (1) in a multi-cloud environment, the cost to switch between infrastructures and to migrate the necessary data structures from one environment to another environment may be more significant than in single cloud environments, and (2) in a multi-cloud environment, one may want to execute in parallel, and with redundancy, some instances of the workflows, to build robustness and increase performance.

Dynamic Allocation of vGPUs for Deep Learning

The exemplary learning techniques for resource allocation presented herein can be used to substantially optimize an execution of deep learning tasks. In this scenario, the control variable is the number of virtual general purpose graphical processing units (vGPUs) and the cost may be measured in monetary or energy units. One goal is to automatically identify regions in the learning algorithm that are I/O or vGPU bound, and to allocate more vGPUs when the processes are in the latter category. As the inputs to the learning algorithms vary over time, the disclosed techniques serve to substantially automatically identify, based on previously observed patterns, how to deal with the allocation of vGPUs to batches of workflows whose characteristics are similar to those previously executed.

Reduction of Energy Consumption in Datacenters

The cost function introduced herein can characterize the energy expenditure associated with the execution of a set of tasks at a given infrastructure. The parameterization of such a function can be executed in a controlled environment, where monitors capture the energy expenditure during each phase of the execution of a given set of tasks. The resulting policy sets the dynamic resource allocation so as to reduce energy consumption.

In one or more embodiments, the present disclosure provides reinforcement learning-based solutions for dynamic allocation of resources using provenance-based simulation to execute automated workflows. In some embodiments, the RL agent aims at substantially minimizing the expected cost to execute a workflow, which depends on the completion time and the amount of resources allocated. One or more embodiments provide a detailed methodology for substantial minimization of workflow execution costs in IaaS environments through RL, leveraging (1) machine learned models for cost initialization, (2) composition of batches of past experiences, (3) provenance-based simulation and/or (4) a particular DNN architecture. The combination of these techniques enhances robustness and speeds up the convergence of the RL process.

Among other benefits, the disclosed simulation-enhanced deep reinforcement learning techniques provide an improved resource allocation for concurrent workflows executing in a shared computing environment.

One or more embodiments of the disclosure provide improved methods, apparatus and computer program products for deep reinforcement learning-based resource allocation in a shared computing environment using provenance-based simulation. The foregoing applications and associated embodiments should be considered as illustrative only, and numerous other embodiments can be configured using the techniques disclosed herein, in a wide variety of different applications.

It should also be understood that the disclosed simulation-enhanced resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for deep reinforcement learning-based resource allocation in a shared computing environment using provenance-based simulation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based simulation-enhanced resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based simulation-enhanced resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
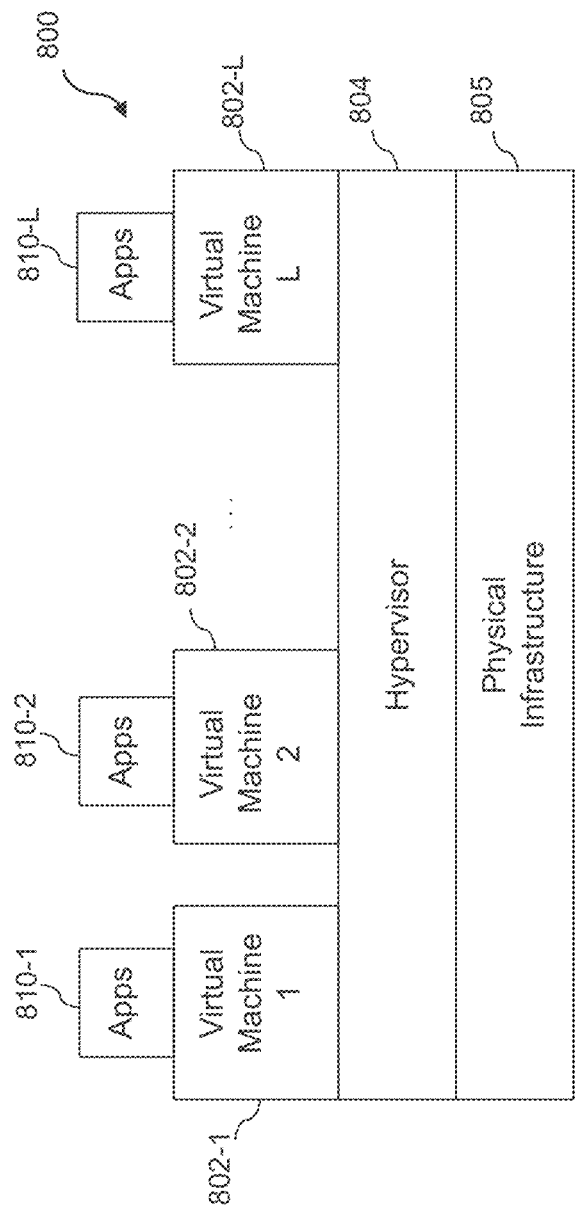
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based simulation-enhanced resource allocation engine in an illustrative embodiment include VNX® and Symmetrix VMAX® storage arrays, software-defined storage products such as ScaleIO™ and ViPR®, all-flash and hybrid flash storage arrays such as Unity™ cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based simulation-enhanced resource allocation apparatus may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a specification of at least one workflow of a plurality of concurrent workflows in a shared computing environment, wherein the specification comprises a plurality of states of the at least one workflow and one or more control variables indicating an allocation of one or more resources for the at least one workflow in the shared computing environment;
obtaining a simulation model that simulates the at least one workflow of the plurality of concurrent workflows representing a plurality of different configurations of the one or more control variables of the at least one workflow of the concurrent workflows by mapping the states of the at least one workflow based on a similarity given by one or more state similarity functions;
evaluating, using at least one processing device, a plurality of values of the one or more control variables for an execution of said plurality of concurrent workflows using at least one reinforcement learning agent, wherein said evaluating comprises observing said plurality of states, including a current state comprising a current configuration of said plurality of concurrent workflows and said shared computing environment, and obtaining an expected utility score for a plurality of combinations of said control variables for the execution of said plurality of concurrent workflows given an allocation of the one or more resources of the shared computing environment corresponding to said combination of said control variables in said current state, wherein the at least one reinforcement learning agent, using one or more training samples from one or more simulations of the at least one workflow by the simulation model, trains a reinforcement learning model used by the at least one reinforcement learning agent; and
providing an allocation of the one or more resources of the shared computing environment reflecting the combination of the control variables having the expected utility score that satisfies one or more predefined score criteria.

2. The method of claim 1, wherein the evaluating the plurality of values of the one or more control variables for the execution of said plurality of concurrent workflows using the at least one reinforcement learning agent further comprises observing the current state and selecting an action based on a path in the simulation model that substantially maximizes at least one utility function for one or more nodes in the simulation model.

3. The method of claim 2, wherein the action is selected based on the path in the simulation model when a configurable threshold satisfies one or more predefined value criteria.

4. The method of claim 1, wherein estimated values of the expected utility score are given by observing the current state and the estimated values of the expected utility score are estimated based on a path in the simulation model that substantially maximizes at least one utility function for one or more nodes in the simulation model for a predefined number of training epochs.

5. The method of claim 1, wherein the reinforcement learning model used by the at least one reinforcement learning agent is trained using the training samples, wherein the training samples comprise input/output training pairs generated from the simulation model as a training batch for a predefined number of training epochs.

6. The method of claim 1, wherein said expected utility score further comprises an expected cost depending on one or more of an execution time of the at least one workflow and a consumption of resources in said shared computing environment.

7. The method of claim 1, wherein said at least one reinforcement learning agent comprises a Deep Q-Learning agent using a Q-Deep Neural Network (QDNN) as a representation of a Q-Function, and wherein said obtaining the expected utility score for the plurality of combinations of said control variables comprises selecting an action at random and computing a cost-to-go from the expected utility score of the selected action updated by an observation of the current state, and wherein an updating of the at least one reinforcement learning agent comprises a training of the QDNN given new samples in iterative epochs.

8. The method of claim 1, wherein the one or more control variables comprise one or more of a number of processing cores allocated to a given workflow and an amount of memory allocated to the given workflow.

9. A system, comprising:
a memory; and
at least one processing device, coupled to the memory, operative to implement the following steps:
obtaining a specification of at least one workflow of a plurality of concurrent workflows in a shared computing environment, wherein the specification comprises a plurality of states of the at least one workflow and one or more control variables indicating an allocation of one or more resources for the at least one workflow in the shared computing environment;
obtaining a simulation model that simulates the at least one workflow of the plurality of concurrent workflows representing a plurality of different configurations of the one or more control variables of the at least one workflow of the concurrent workflows by mapping the states of the at least one workflow based on a similarity given by one or more state similarity functions;
evaluating, using at least one processing device, a plurality of values of the one or more control variables for an execution of said plurality of concurrent workflows using at least one reinforcement learning agent, wherein said evaluating comprises observing said plurality of states, including a current state comprising a current configuration of said plurality of concurrent workflows and said shared computing environment, and obtaining an expected utility score for a plurality of combinations of said control variables for the execution of said plurality of concurrent workflows given an allocation of the one or more resources of the shared computing environment corresponding to said combination of said control variables in said current state, wherein the at least one reinforcement learning agent, using one or more training samples from one or more simulations of the at least one workflow by the simulation model, trains a reinforcement learning model used by the at least one reinforcement learning agent; and
providing an allocation of the one or more resources of the shared computing environment reflecting the combination of the control variables having the expected utility score that satisfies one or more predefined score criteria.

10. The system of claim 9, wherein the evaluating the plurality of values of the one or more control variables for the execution of said plurality of concurrent workflows using the at least one reinforcement learning agent further comprises observing the current state and selecting an action based on a path in the simulation model that substantially maximizes at least one utility function for one or more nodes in the simulation model.

11. The system of claim 9, wherein estimated values of the expected utility score are given by observing the current state and the estimated values of the expected utility score are estimated based on a path in the simulation model that substantially maximizes at least one utility function for one or more nodes in the simulation model for a predefined number of training epochs.

12. The system of claim 9, wherein the reinforcement learning model used by the at least one reinforcement learning agent is trained using the training samples, wherein the training samples comprise input/output training pairs generated from the simulation model as a training batch for a predefined number of training epochs.

13. The system of claim 9, wherein said expected utility score further comprises an expected cost depending on one or more of an execution time of the at least one workflow and a consumption of resources in said shared computing environment.

14. The system of claim 9, wherein said at least one reinforcement learning agent comprises a Deep Q-Learning agent using a Q-Deep Neural Network (QDNN) as a representation of a Q-Function, and wherein said obtaining the expected utility score for the plurality of combinations of said control variables comprises selecting an action at random and computing a cost-to-go from the expected utility score of the selected action updated by an observation of the current state, and wherein an updating of the at least one reinforcement learning agent comprises a training of the QDNN given new samples in iterative epochs.

15. A computer program product, comprising a non-transitory machine-readable storage medium having encoded therein executable code of one or more software programs, wherein the one or more software programs when executed by at least one processing device perform the following steps:
obtaining a specification of at least one workflow of a plurality of concurrent workflows in a shared computing environment, wherein the specification comprises a plurality of states of the at least one workflow and one or more control variables indicating an allocation of one or more resources for the at least one workflow in the shared computing environment;
obtaining a simulation model that simulates the at least one workflow of the plurality of concurrent workflows representing a plurality of different configurations of the one or more control variables of the at least one workflow of the concurrent workflows by mapping the states of the at least one workflow based on a similarity given by one or more state similarity functions;

evaluating, using at least one processing device, a plurality of values of the one or more control variables for an execution of said plurality of concurrent workflows using at least one reinforcement learning agent, wherein said evaluating comprises observing said plurality of states, including a current state comprising a current configuration of said plurality of concurrent workflows and said shared computing environment, and obtaining an expected utility score for a plurality of combinations of said control variables for the execution of said plurality of concurrent workflows given an allocation of the one or more resources of the shared computing environment corresponding to said combination of said control variables in said current state, wherein the at least one reinforcement learning agent, using one or more training samples from one or more simulations of the at least one workflow by the simulation model, trains a reinforcement learning model used by the at least one reinforcement learning agent; and providing an allocation of the one or more resources of the shared computing environment reflecting the combination of the control variables having the expected utility score that satisfies one or more predefined score criteria.

16. The computer program product of claim 15, wherein the evaluating the plurality of values of the one or more control variables for the execution of said plurality of concurrent workflows using the at least one reinforcement learning agent further comprises observing the current state and selecting an action based on a path in the simulation model that substantially maximizes at least one utility function for one or more nodes in the simulation model.

17. The computer program product of claim 15, wherein estimated values of the expected utility score are given by observing the current state and the estimated values of the expected utility score are estimated based on a path in the simulation model that substantially maximizes at least one utility function for one or more nodes in the simulation model for a predefined number of training epochs.

18. The computer program product of claim 15, wherein the reinforcement learning model used by the at least one reinforcement learning agent is trained using the training samples, wherein the training samples comprise input/output training pairs generated from the simulation model as a training batch for a predefined number of training epochs.

19. The computer program product of claim 15, wherein said expected utility score further comprises an expected cost depending on one or more of an execution time of the at least one workflow and a consumption of resources in said shared computing environment.

20. The computer program product of claim 15, wherein said at least one reinforcement learning agent comprises a Deep Q-Learning agent using a Q-Deep Neural Network (QDNN) as a representation of a Q-Function, and wherein said obtaining the expected utility score for the plurality of combinations of said control variables comprises selecting an action at random and computing a cost-to-go from the expected utility score of the selected action updated by an observation of the current state, and wherein an updating of the at least one reinforcement learning agent comprises a training of the QDNN given new samples in iterative epochs.

* * * * *